United States Patent
Bittner (10) Patent No.: US 6,176,626 B1
(45) Date of Patent: Jan. 23, 2001

(54) CAMERA HAVING A BARRIER ASSEMBLY COMPRISING AN INTEGRATED LENS COVER/LIGHT HOOD

(75) Inventor: Wilfried Bittner, Tsuen Wan (HK)

(73) Assignee: Concord Camera Corporation, Hollywood, FL (US)

( * ) Notice: Under 35 U.S.C. 154(b), the term of this patent shall be extended for 0 days.

(21) Appl. No.: 09/309,434

(22) Filed: May 11, 1999

(51) Int. Cl.[7] .............................. G03B 11/04; G03B 17/04
(52) U.S. Cl. ........................... 396/448; 396/348; 396/534
(58) Field of Search .................... 396/348, 349, 396/350, 448, 534, 544, 545

(56) References Cited

U.S. PATENT DOCUMENTS

| | | | |
|---|---|---|---|
| 3,153,375 | * 10/1964 | Zapp | 396/448 |
| 4,096,506 | 6/1978 | Lange | 354/288 |
| 4,240,735 | 12/1980 | Maitani et al. | 354/288 |
| 4,363,546 | 12/1982 | Enomoto et al. | 354/195 |
| 4,367,028 | 1/1983 | Tomatsuri et al. | 354/288 |
| 4,451,130 | 5/1984 | Yan | 354/82 |
| 4,522,478 | 6/1985 | Kando et al. | 354/288 |
| 5,212,510 | 5/1993 | Baxter | 354/187 |
| 5,541,696 | 7/1996 | Bittner | 354/288 |
| 5,594,523 | 1/1997 | Fujisaki | 396/448 |
| 5,608,478 | 3/1997 | Kamoda | 396/503 |
| 5,689,733 | 11/1997 | Zawodny et al. | 396/6 |
| 5,701,533 | 12/1997 | Suzuki et al. | 396/349 |
| 5,708,884 | 1/1998 | Morishita | 396/349 |
| 5,708,891 | 1/1998 | Ando et al. | 396/448 |
| 5,708,895 | 1/1998 | Ando et al. | 396/535 |
| 5,737,658 | 4/1998 | Arai | 396/448 |
| 5,740,480 | 4/1998 | Kuhn, Jr. et al. | 396/177 |
| 5,745,803 | 4/1998 | Ito | 396/83 |
| 5,754,906 | 5/1998 | Yoshida | 396/448 |
| 5,761,556 | 6/1998 | Ichino | 396/349 |
| 5,765,068 | 6/1998 | Kamoda | 396/448 |
| 5,797,047 | 8/1998 | Ando et al. | 396/349 |
| 5,805,947 | 9/1998 | Miyamoto et al. | 396/448 |
| 5,819,127 | 10/1998 | Yokota | 396/349 |
| 5,832,311 | 11/1998 | Zawodny et al. | 396/6 |
| 5,862,414 | 1/1999 | Zawodny et al. | 396/6 |

* cited by examiner

*Primary Examiner*—Alan A. Mathews
(74) *Attorney, Agent, or Firm*—Woodcock Washburn Kurtz Mackiewicz & Norris LLP (57) ABSTRACT

A camera has a barrier assembly that comprises an integrated lens cover/light hood, and a rotatable door. The assembly is movable between an open and a closed position. The assembly functions as a protective barrier for the camera's picture-taking lens when disposed in the closed position. The door is located within an aperture defined by the lens cover/light hood when the assembly is closed. The door rotates away from the aperture as the assembly translates to the open position. The aperture is substantially aligned with the optical axis of the picture-taking lens as the assembly reaches its open position, thereby allowing ambient light to reach the picture-taking lens. The lens cover/light hood isolates the lens from ambient light outside the field of view of the lens when the assembly is in its open position.

20 Claims, 4 Drawing Sheets

CAMERA HAVING A BARRIER ASSEMBLY COMPRISING AN INTEGRATED LENS COVER/LIGHT HOOD

BACKGROUND OF THE INVENTION

The picture-taking lens of a camera defines a certain field of view. Light outside of this field of view, if allowed to reach the lens, can degrade the quality of the photographs taken by the camera. The imperfections that appear on finished photographic prints due to this phenomenon are known in the art as "flare" and "glare."

The problem of flare and glare is usually addressed by the use of a light hood. A light hood typically comprises some type of barrier that is placed around the optical axis of the picture-taking lens, directly forward of the lens. A light hood isolates the lens from light outside the field of view of the lens. When properly sized and positioned, the hood performs this function without attenuating or interfering with the desired field of view of the lens.

Light hoods may be fixed in a single position. Alternatively, a light hood may be adapted to retract or otherwise translate into a stored position when the camera is not in use. This feature is often employed in compact cameras, where minimal external dimensions are considered a highly desirable characteristic. Accommodating a stored hood, however, typically necessitates some increase in the dimensions of a camera in relation to a comparable camera that does not utilize a light hood.

Physical damage and contamination represent another common problem that affects the picture-taking lens. Physical damage, e.g., cracking or scratching, can occur when relatively hard objects come into contact with the lens. Lens contamination may be caused by factors such as dust and dirt. Fingerprints are another common form of lens contamination. Contamination and physical damage of the picture-taking lens can significantly degrade the quality of the photographs taken through the lens.

The picture-taking lens of most cameras is protected by some type of cover. The use of a protective lens cover is a virtual necessity in most compact cameras due to the proximity of the lens and the front surface of the camera. Lens covers are also utilized to prevent unintentional exposure of the photographic film when the camera's shutter is inadvertently actuated. The lens cover is positioned in front of the picture-taking lens when the camera is not in use. A lens cover may comprise a cap that is completely removed from the camera prior to use. Alternatively, a lens cover may be integrated into the body of the camera in a manner that allows the cover to translate away from the lens while remaining attached to the camera. This type of cover is often used in compact cameras, where ease of operation and portability are highly valued. Integral covers typically necessitate some increase in the external dimensions of a camera.

Integrating the functions of a light hood and a lens cover into a single assembly offers the potential for a reduction in the external dimensions of a camera in relation to a design in which these functions are performed by separate components. Thus, a need exists for a camera with an assembly that performs the functions of both a light hood and a lens cover. The assembly should effectively block light outside the field of view of the camera's picture-taking lens. The assembly should also be adapted to form a protective barrier in front of the lens. The barrier should isolate the lens from light, external objects, and contaminants. An assembly of minimal size is desirable. Furthermore, the assembly should be integrated with the body of the camera in a manner that minimizes the camera's overall dimensions. The assembly should be of minimal complexity, and should have a relatively low parts count and production cost. The present invention achieves these and other goals.

SUMMARY OF THE INVENTION

The present invention provides a camera having an integrated, i.e., single-piece, lens cover/light hood. The cover/hood is incorporated into a barrier assembly coupled to a front portion of the camera. The barrier assembly is movable between an "open" and a "closed" position. The assembly functions as a light hood when disposed in the open position. When closed, the assembly forms a protective surface in front of the picture-taking lens of the camera.

The integrated cover/hood defines an aperture. A preferred embodiment of the barrier assembly further comprises a rectangular door. The dimensions of the door are about equal to those of the cover/hood aperture. The door is disposed within the aperture when the barrier assembly is closed. The cover/hood and the door form a substantially continuous surface forward of the picture-taking lens when disposed in this manner. The assembly thereby protects the lens from physical damage and contamination. Additionally, the design of the assembly causes the cover/hood and the door to lie substantially flush with a front surface of the camera when the barrier assembly is in the closed position.

The cover/hood translates along an arcuate path as the barrier assembly is moved to the open position. Thus, the cover/hood translates axially, in a direction away from the front portion of the camera. The cover/hood also translates laterally in relation to the front portion. In a preferred embodiment, the cover/hood is rotatably coupled to the door. Another portion of the door is rotatably coupled to a front portion of the camera. This arrangement causes the door to rotate in relation to the hood and the front portion. Specifically, the door rotates through an arc of about 90 degrees as the barrier assembly translates between the closed and open positions. The door thereby moves out of the cover/hood aperture as the assembly translates to the open position.

The cover/hood aperture is substantially aligned with the optical axis of the picture-taking lens when barrier assembly reaches the open position. The aperture thereby allows ambient light to reach the lens. Furthermore, the arcuate path of the cover/hood as it moves from the closed to the open positions causes the aperture to be disposed at a distance from the lens. Separating the aperture and the lens by this distance isolates the lens from unwanted light. More particularly, the cover/hood and the door form an opaque structure that surrounds the optical axis of the lens. The dimensions of the aperture, and the distance between the aperture and the lens are optimized in a manner that causes the cover/hood to isolate the lens from light outside the field of view of the lens. Furthermore, the cover/hood and the door perform this blocking function without attenuating or interfering with the desired field of view of the lens.

BRIEF DESCRIPTION OF THE DRAWINGS

The foregoing summary, as well as the following detailed description of the preferred embodiment, is better understood when read in conjunction with the appended drawings. For the purpose of illustrating the invention, the drawings show an embodiment that is presently preferred. The invention is not limited, however, to the specific instrumentalities disclosed in the drawings. In the drawings.

DESCRIPTION OF THE PREFERRED EMBODIMENTS

The present invention provides a camera having an integrated, i.e., single-piece, lens cover/light hood. The integrated cover/hood is incorporated into a barrier assembly coupled to a front portion of the camera. A preferred embodiment of the invention is described in connection with a conventional 35-mm camera. This particular embodiment of the invention is presented for exemplary purposes only. Accordingly, the invention should not be limited to the particular embodiment shown, as the invention can be applied to cameras of virtually any conventional design. For example, the invention is applicable to cameras that utilize other types of film, such as Advanced-Photo System (APS) film or instant film. The invention can also be used in conjunction with cameras that record photographic images on some type of electronic medium. Furthermore, the invention is readily adaptable to reusable and single-use cameras.

A preferred embodiment of the invention is illustrated in FIGS. 1 through 8. The invention provides a camera 10. The camera 10 comprises a body 11 having a front portion 12 and a front surface 12a. The camera 10 also comprises a picture-taking lens 13. The lens 13 has a nominal diameter of 30-mm. (This dimension is presented for exemplary purposes only, as the invention is equally applicable to cameras having lenses of other sizes, such as the 23-mm to 25-mm lenses typically used in APS cameras). The lens 13 is disposed on, and/or projects through the body 11 proximate the front surface 12a. The lens 13 defines an optical axis 14 ("optical axis 14" refers to an imaginary line about which the lens 13 is symmetrically disposed in the manner shown in the figures).

The exemplary camera 10 is compact in size, with a small front-to-back thickness. The camera 10 may include an array 15 of elements such as a flash, a viewfinder, a range finder, a sensor for remote operation, and the like. The camera 10 further comprises a barrier assembly 16. The assembly 16 is disposed on the front portion 12 of the camera body 11. The assembly 16 comprises an integrated lens cover/light hood 17. The assembly 16 also comprises a door 18. The cover/hood 17 defines an aperture 19. For a 30-mm lens 13, the aperture 19 preferably has a width (y-axis dimension) of about 12.9 mm and a height (x-axis dimension) of about 10.4 mm. (These dimensions are presented for exemplary purposes only. The dimensions may vary depending on the chosen lens 13). The door 18 is rotatably coupled to the cover/hood 17 and the front portion 12. The door 18 and the cover/hood 17 are preferably manufactured from an impact-resistant material such as metal or high-impact plastic.

Figure 1:
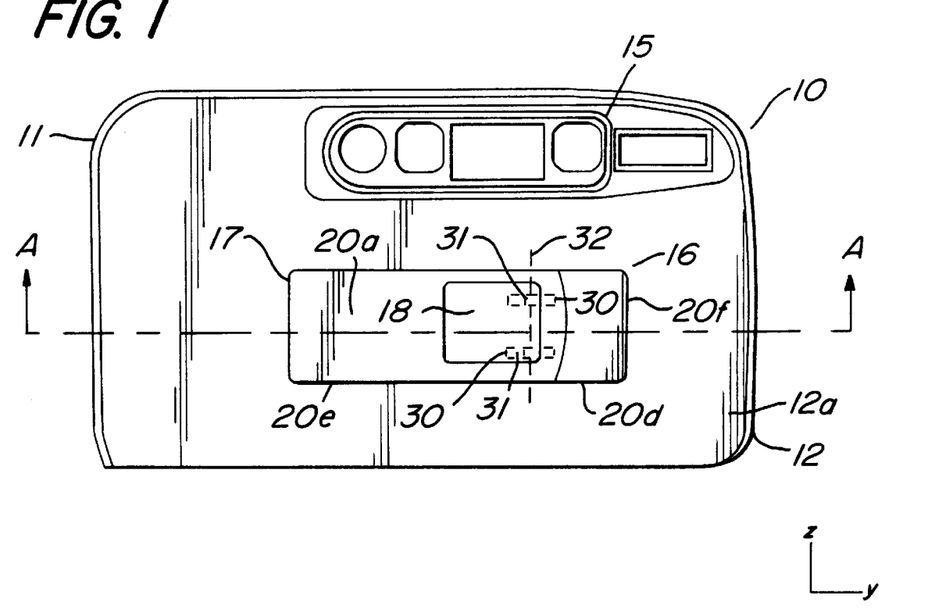
FIG. 1 is a front view of a camera having a barrier assembly in accordance with the present invention, with the assembly in the closed position.
Figure 2:
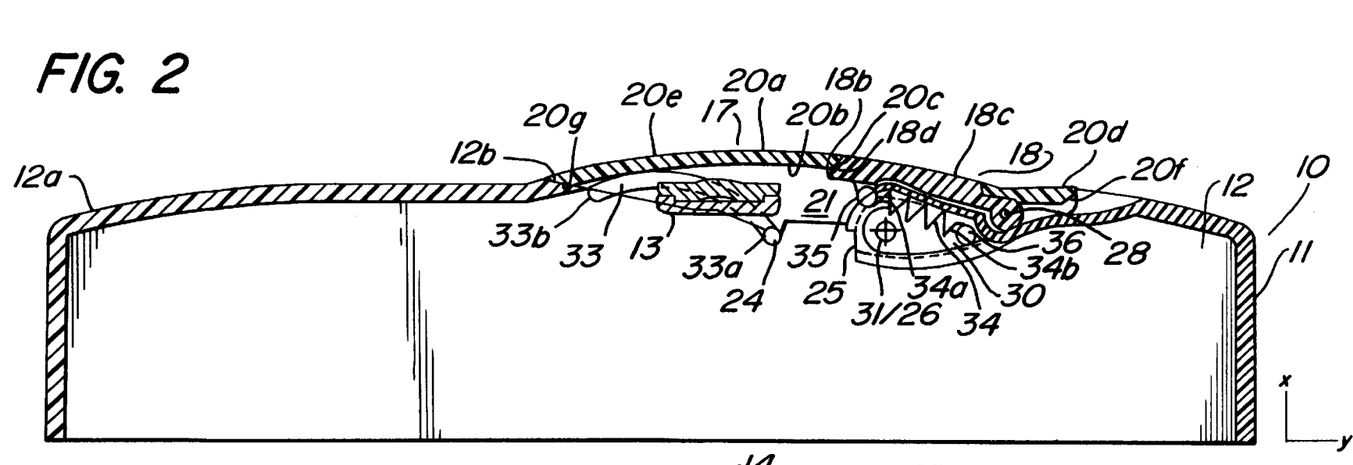
FIG. 2 is a cross-section through line A—A of FIG. 1, with the barrier assembly in the closed position.
Figure 3:
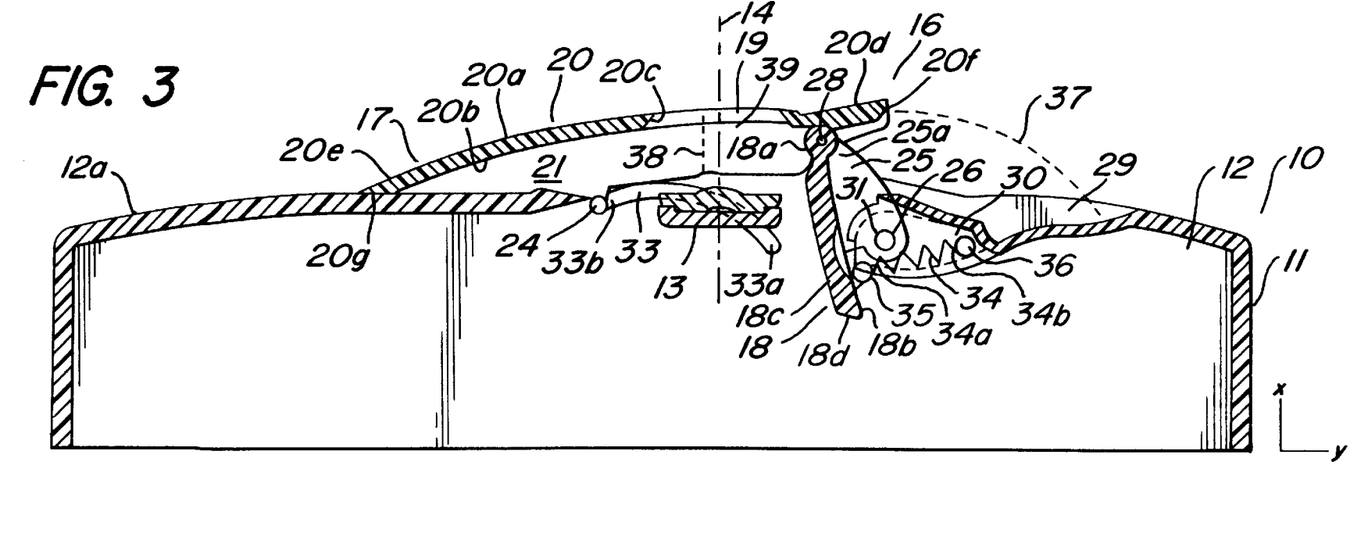
FIG. 3 is a cross-section through line A—A of FIG. 1, with the barrier assembly in the open position.

The barrier assembly 16 is movable between a "closed" position, as shown in FIGS. 1 and 2, and an "open" position, as shown in FIG. 3 (for illustrative clarity, the internal components of the camera 10 are not shown in the cross-sectional views of FIGS. 2 and 3). The assembly 16 is manually movable in the exemplary embodiment, i.e., the assembly 16 is moved between its open and closed positions by hand. Variations of the camera 10 within the contemplated scope of the invention may comprise a motorized mechanism that drives the assembly 16 between the open and closed positions.

The aperture 19 is substantially aligned with the optical axis 14 of the lens 13 when the barrier assembly 16 is in its open position. Furthermore, the door 18 is disposed at an angle of about 90 degrees in relation to the aperture 19 when the assembly 16 is positioned in this manner. The aperture 19 thereby allows ambient light to pass through the assembly 16 and reach the lens 13. Additionally, the assembly 16 functions as a light hood when disposed in its open position. More particularly, the assembly 16 substantially isolates the lens 13 from ambient light outside the field of view of the lens 13. This feature prevents the flare and glare that can appear on a finished photographic print when such light is allowed to reach the lens 13.

The barrier assembly 16 translates both laterally and axially in relation to the front portion 12 when the assembly 16 moves between the open and closed positions. (The terms "lateral" and "axial," as used throughout this specification, refer respectively to the "y" and "x" directions denoted in the figures, as shown in the bottom right-hand corner of the drawings.) At least a portion of the cover/hood 17 is substantially aligned with the optical axis 14 of the lens 13 when the assembly 16 is closed, i.e., a portion of the cover/hood 17 is positioned directly in front of the lens 13. Furthermore, the door 18 is disposed within the aperture 19 when the assembly 16 is so positioned. The assembly 16 thereby prevents any ambient light from reaching the lens 13. This feature aids in protecting the photographic film in the camera 10 from unintentional exposure. (The exemplary camera 10 may also have an interlock of common design that prevents the camera's shutter from being inadvertently actuated when the assembly 16 is in its closed position, further protecting the film from unintentional exposure.) Additionally, the assembly 16 forms a rigid and continuous surface in front of the lens 13. The assembly 16 thus protects the lens 13 from physical damage such as cracking and scratching. The assembly 16 also isolates the lens 13 from contamination due to factors such as dust, dirt, and fingerprints. Hence, the assembly 16 acts as a protective barrier for the lens 13, as well as a hood that prevents unwanted light from reaching the lens 13.

Structural details of the barrier assembly 16 are as follows. The cover/hood 17 comprises a vertical member 20 having a front surface 20a and a rear surface 20b. Edges 20c of the vertical member 20 define the aperture 19. The edges 20c are preferably beveled, i.e., the edges 20c are disposed at an oblique angle in relation to the adjoining surfaces 20a and 20b. This feature is best shown in FIG. 3.

An end portion 20d of the vertical member 20 is preferably flat. The remainder of the vertical member 20 comprises a curved portion 20e. The end portion 20d is preferably tapered upward in relation to an adjoining segment of the curved portion 20e. The vertical member 20 comprises an edge 20f. The edge 20f adjoins the end portion 20d, and is preferably beveled.

The cover/hood 17 further comprises two horizontal members 21. The members 21 are disposed on the rear surface 20b. The members 21 are positioned along the top and bottom of the surface 20b, and span substantially the entire width, i.e., lateral dimension, of the surface 20b. The members 21 preferably have the characteristic shape illustrated in the figures.

Figure 4:
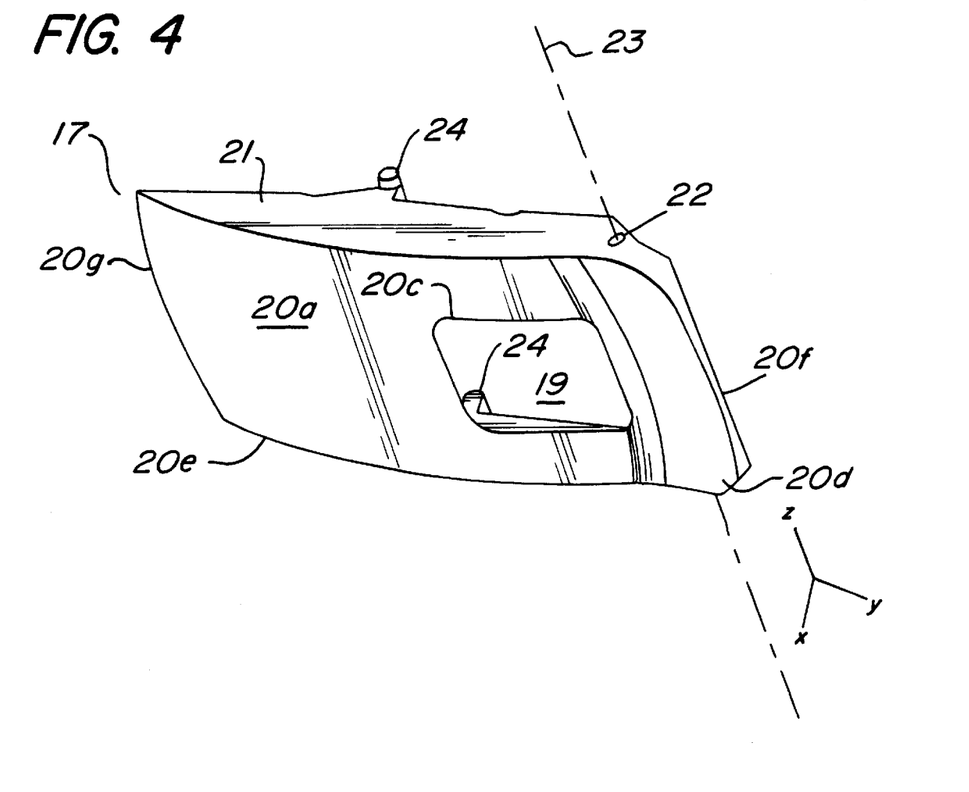
FIG. 4 is a perspective view showing a lens cover/light hood of the barrier assembly of the camera of FIG. 1.
Figure 5:
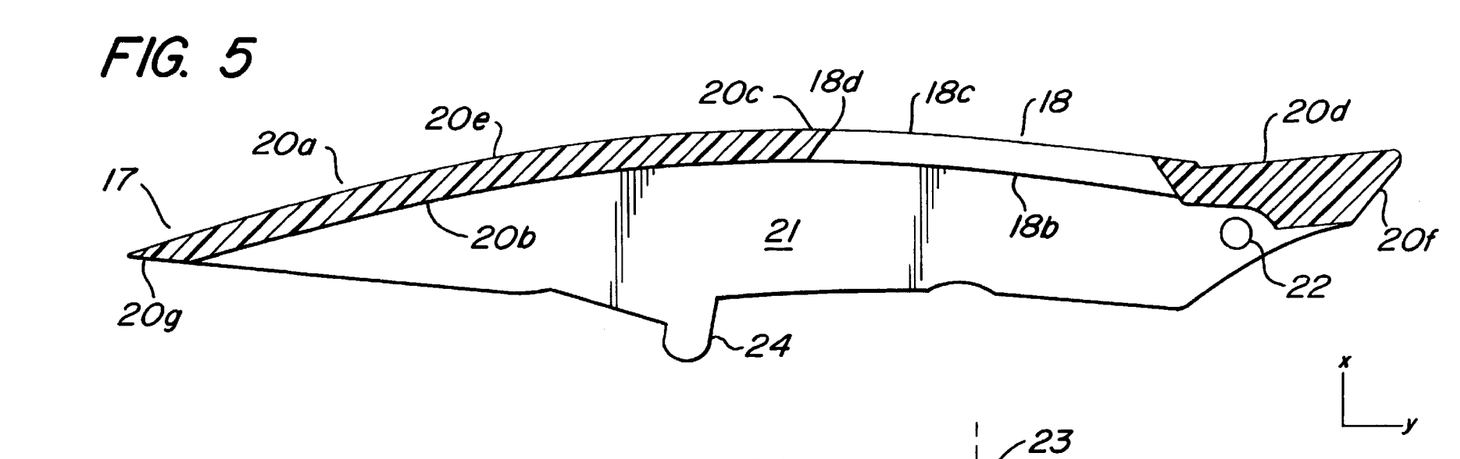
FIG. 5 is a bottom view of the lens cover/light hood of FIG. 4.
Figure 6:
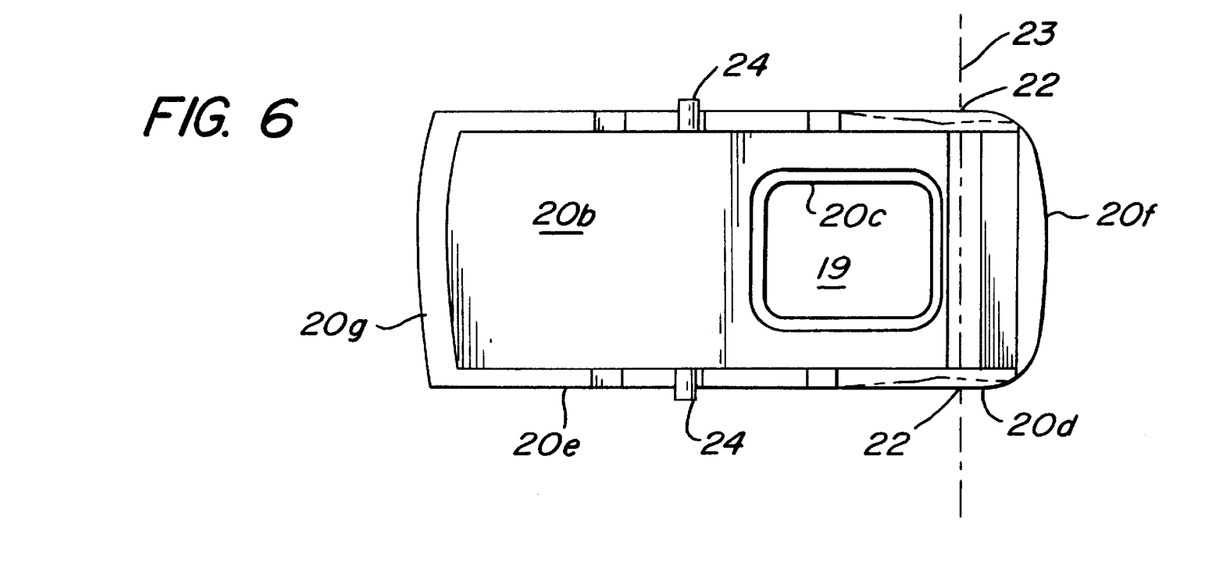
FIG. 6 is a back view of the light hood of FIG. 4.
Figure 7:
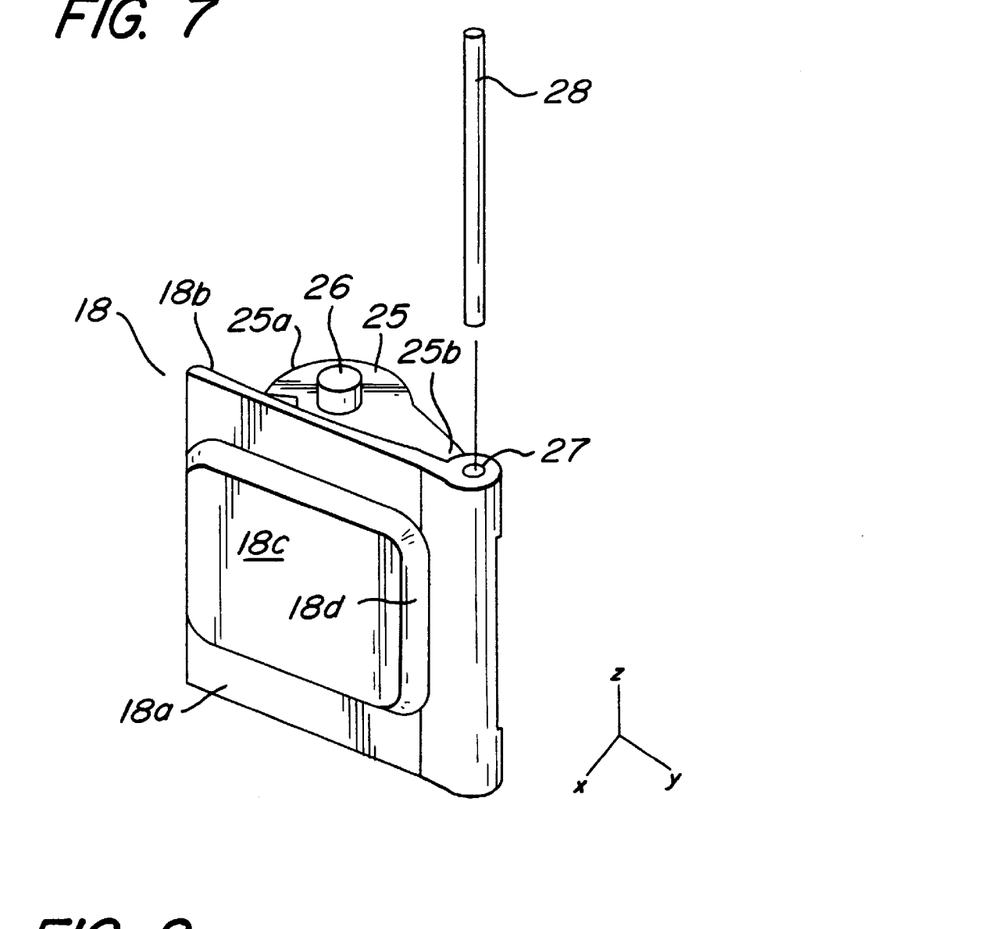
FIG. 7 is a perspective view showing a door of the barrier assembly of FIG. 1.
Figure 8:
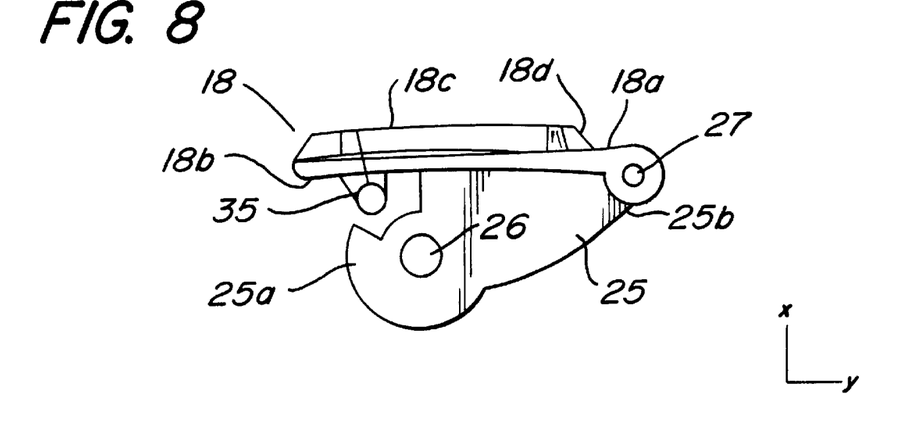
FIG. 8 is a bottom view of the door of FIG. 7.

The horizontal members 21 each define an aperture 22. The apertures 22 are disposed proximate the edge 20f of the vertical member 20. The apertures 22 are vertically aligned, i.e., the apertures are disposed along a common vertical line. (The term "vertical," as used throughout this specification, refers to the "z" direction denoted in the figures.) The apertures 22 define a first axis 23, as is illustrated in FIGS. 4 and 6.

Each horizontal member 21 comprises a guide pin 24. The guide pins 24 are disposed on a top surface of the uppermost member 21, and on a bottom surface of the lowermost member 21. The guide pins 24 are vertically aligned.

The door 18 has a front surface 18a and a rear surface 18b. The front surface 18a comprises a raised segment 18c. The raised segment 18c is elevated in relation to the remaining portion of the surface 18a. Edges 18d of the raised segment 18c are preferably beveled. The dimensions of the raised segment 18c are about equal to those of the aperture 19. The raised segment 18c is positioned within the aperture 19 when the barrier assembly 16 is in its closed position.

The door 18 further comprises two ribs 25. The ribs 25 are disposed on the rear surface 18b. A mounting post 26 is disposed on each rib 25. Each mounting post 26 is positioned proximate an end 25a of each rib 25. The mounting posts 26 are disposed on a top surface of the uppermost rib 25, and on a bottom surface of the lowermost rib 25. The mounting posts 26 are vertically aligned.

The door 18 defines two apertures 27. The apertures 27 are vertically aligned, and are disposed proximate an end 25b of each rib 25. The apertures 27 are substantially aligned with the apertures 22 of the cover/hood 17 when the assembly 16 is installed on the camera body 11. A mounting pin 28 is disposed within the apertures 22 and 27, thereby coupling the door 18 and the cover/hood 17. Hence, the door 18 is rotatably coupled to the cover/hood 17 about the first axis 23.

The front portion 12 of the camera body 11 defines a recess 29. The camera body 11 comprises two ribs 30. The ribs 30 are disposed on the front portion 12, within the recess 29. Each rib 30 defines an aperture 31. The apertures 31 are vertically aligned, and define a second axis 32 (shown in FIG. 1). The mounting posts 26 of the door 18 are disposed within the apertures 31, thereby coupling the door 18 and the front portion 12. Hence, the door 18 is rotatably coupled to the front portion 12' about the second axis 32.

The front portion 12 further defines two arcuately-shaped slots 33. The slots 33 are disposed proximate the recess 29. The guide pins 24 of the cover/hood 17 are disposed within the slots 33. Each pin 24 slidably engages the corresponding slot 33 when the barrier assembly 16 moves between the open and closed positions. Each slot 33 has a first end 33a and a second end 33b. The end 33a is disposed at a farther distance from the front surface 12a than the end 33b, as is shown in FIGS. 2 and 3.

The cover preferably comprises a spring 34. A first end 34a of the spring 34 is fixed to a spring post 35. The spring post 35 is disposed on the rear surface 18b of the door 18, between the ribs 25. A second end 34b of the spring 34 is fixed to a spring post 36. The spring post 36 is disposed on the front portion 12, between the ribs 30.

Details regarding the operation of the barrier assembly 16 are as follows. The assembly 16 functions as both a light hood and a protective lens barrier, as noted previously. The particular function of the assembly 16 is dependent upon the position in which the assembly 16 is disposed.

Referring to FIG. 2, the door 18 lies substantially parallel to an adjacent portion of the cover/hood 17 when the assembly 16 is in the closed position. The raised segment 18c of the door 18 is disposed within the aperture 19 when the assembly 16 is so positioned. The door 18 and the cover/hood 17 thereby form a substantially smooth and continuous surface forward of the lens 13. This surface functions as a protective barrier that isolates the picturetaking lens 13 from physical objects as well as ambient light. Furthermore, the beveled geometry of the edges 20c and 18d cause an overlap between the adjacent portions of the aperture 19 and the raised segment 18c. This feature increases the effectiveness of the assembly 16 as a light barrier.

The guide pins 24 are positioned at the ends 33a of the slots 33 when the assembly 16 is closed. Hence, a substantial portion of each horizontal member 21 is retracted into the recess 29 when the assembly 16 is closed. This arrangement, combined with the orientation of the door 18, give the assembly 16 a compact profile when closed. In particular, the protrusion of the assembly 16 from the front portion 12 is minimal when the assembly 16 is closed.

The isolation of the lens 13 from ambient light is further enhanced by the geometry of an edge 12b on the front surface 12a and an edge 20g on the vertical member 20. The edge 12b is raised and beveled, as shown in FIGS. 2 and 3. The edge 20g is beveled at a substantially identical angle. This geometry causes the edge 20g to lie substantially flat against the edge 12b when the barrier assembly 16 is in the closed position. Hence, the passage of light between the edges 12b and 20g is inhibited when the assembly 16 is closed.

The barrier assembly 16 is biased in the closed position by the spring 34. The spring 34 is arranged in an over-the-center configuration, i.e., the direction of the spring bias is dependent upon the position of the assembly 16. More specifically, the spring 34 biases the assembly 16 in the closed position while the end 34a is positioned forward of the point of rotation of the door 18, i.e., while the end 34a is located between the first axis 23 and the front surface 12a. Conversely, the spring 34 biases the assembly 16 in the open position while the end 34a is positioned behind the point of rotation of the door 18, i.e., while the first axis 23 is located between the end 34a and the front surface 12a.

Movement of the barrier assembly 16 between the open and closed positions is accomplished manually in the subject embodiment, as noted previously. The user of the camera 10 moves the assembly 16 from the closed to the open positions by exerting an upward force on the edge 20f of the vertical member 20. More particularly, the user exerts a force in the axial and lateral directions to move the edge 20f along an arcuate path 37, as shown in FIG. 3. The beveled edge 20f and the upturned orientation of the portion 20d on the vertical member 20 facilitate an effective grasp of the assembly 16 by the user.

The translation of the vertical member 20 imparts a movement to the door 18 by way of the mounting pin 28 disposed in the apertures 22 and 27. The coupling of the door 18 to the ribs 30 constrains the door 18 to rotational movement about the second axis 32. This constraint, in turn, defines the path 37 along which the edge 20f translates. Furthermore, the coupling of the ribs 30, door 18, and cover/hood 17 causes the first axis 23 to revolve with respect to the second axis 32.

The motion of the cover/hood 17 is further constrained by the engagement of the pins 24 and the slots 33. In particular, this engagement causes the portion of the cover/hood 17 that adjoins the pins 24 to follow an arcuate path defined by the slots 33. The relatively shallow arc of the slots 33 minimizes the overall rotation of the cover/hood 17 in relation to the camera body 11. The pure rotational motion of the door 18, combined with the minimal rotation of the cover/hood 17, causes the door 18 t6 rotate in relation to the cover/hood 17. More specifically, the door 18 rotates about the first axis 23.

The over-the-center configuration of the spring 34 causes the spring bias to change direction as the door 18 has partially rotated through its range of travel, i.e., the spring bias shifts toward the open position as the barrier assembly 16 is moved toward that position. Hence, the degree of force necessary to move the edge 20f along the path 37 decreases as the assembly 16 approaches the open position. Furthermore, the spring bias causes the assembly 16 to remain in the open position once the assembly 16 is so disposed.

The barrier assembly 16 reaches its open position as the guide pins 24 reach the ends 33b of the slots 33. Further movement of the assembly 16 is restricted by the contact between the pins 24 and the ends 33b. The door 18 rotates through a counterclockwise arc of about 90 degrees (as viewed from the perspective of FIGS. 2 and 3) as the assembly 16 travels from the closed to the open positions. Hence, the door 18 is arranged in a substantially perpendicular orientation in relation to both the front surface 12a and an adjacent portion of the cover/hood 17 when the assembly 16 reaches the open position.

The cover/hood 17 translates along an arcuate path as the barrier assembly 16 moves between the open and closed positions. Hence, the cover/hood 17 translates with a combination of axial and lateral movement in relation to the front surface 1 2a. This motion causes the aperture 19 to move in an axial direction away from the front portion 12 as the cover is opened. The aperture 19 also moves laterally, in a direction toward the lens 13. This combined motion causes the aperture 19 to substantially align with the optical axis 14 of the lens 13 when the assembly 16 is opened. Furthermore, the aperture 19 is disposed forward of the lens 13 by a distance 38. The distance 38 is preferably about 6.6 mm in the exemplary embodiment (this value is dependent upon on the dimensions of the lens 13, and may therefore vary in other embodiments).

The aperture 19 thus allows ambient light to reach the lens 13 when the barrier assembly 16 is placed in the open position. Furthermore, positioning the aperture 19 in the above-noted manner causes the cover/hood 17 to function as a light hood. The effectiveness of the cover/hood 17 as a light hood is dependent upon the distance 38 between the aperture 19 and the lens 13. The effectiveness is also a function of the width and the height of the aperture 19. The previously-noted values for these dimensions are tailored to provide an optimum light-blocking effect in the exemplary embodiment. This effect substantially isolates the lens 13 from ambient light outside the field of view of the lens 13. Furthermore, this isolation is achieved without attenuating or interfering with the desired field of view of the lens 13. The cover/hood 17 thus limits the exposure of the lens 13. In particular, the exposure of the lens 13 is substantially limited to ambient light within the field of view of the lens 13. The cover/hood 17 thereby enhances the quality of the photographs taken by the camera 10. Specifically, the cover/hood 17 prevents the flare and glare that can appear on finished photographic prints when the lens 13 is exposed to light outside the field of view of the lens 13.

The effectiveness of the assembly 16 as a light hood is further enhanced by the configuration of the horizontal members 21 and the door 18. More particularly, the forward surface 18a of the door 18 and a portion of each member 21 form a portion of a tunnel 39. The tunnel 39 is positioned around the optical axis 14, between the aperture 19 and the lens 13. The tunnel 39 further isolates the lens 13 from ambient light outside of the field of view of the lens 13. Furthermore, the relatively small dimensions of the tunnel 39 inhibit any inadvertent touching of the lens 13 by the camera user when the assembly 16 is in the open position. The tunnel 39 thereby protects the lens 13 from being contaminated with fingerprints.

The lens 13 is also isolated by the curved portion 20e of the vertical member 20. In particular, the geometry of the curved portion 20e causes the portion 20e to form a continuous surface between the aperture 19 and the front surface 12a. This continuous surface prevents ambient light from reaching the lens 13 from the side of the lens 13 on which the portion 20e is situated.

The barrier assembly 16 is returned to the closed position by the application of a lateral force to the flat portion 20d of the vertical member 20. Alternatively, the camera user may apply a lateral force to the curved portion 20e of the member 20. The application of either such force causes the assembly 16 to translate in a manner directly opposite to that described in connection with the opening of the assembly 16. Furthermore, the bias of the spring 34 shifts toward the closed position as the assembly 16 approaches that position, thereby lessening the force needed to close the assembly 16.

Integrating the functions of a lens barrier and a light-hood into a single mechanism, i.e., the barrier assembly 16, significantly reduces the dimensions of the camera 10 in relation to a camera in which these functions are performed by separate components. In particular, the design of the assembly 16 minimizes the amount of space needed to house the assembly 16 when the camera 10 is not in use. This characteristic allows the assembly 16 to be stored in a manner that results in a minimal protrusion of the assembly 16 from the camera body 11. The overall compactness of the assembly 16 is particularly advantageous in cameras that are subject to strict spatial constraints.

The mechanical complexity of the barrier assembly 16 is low. In particular, the number of parts that make up the assembly 16 is minimal. Furthermore, the mechanical relationships among the individual parts of the assembly 16 are relatively uncomplicated. For example, the moving parts of the assembly 16 are coupled via simple pins and posts, and translate along direct arcuate paths. Additionally, the assembly 16 requires no movement or reconfiguration of the lens 13 or the film-exposure shutter of the camera 10 as the assembly 16 is opened and closed. Hence, the assembly 16 adds minimally to the complexity, cost, and overall parts count of the camera 10.

The barrier assembly 16 can readily be coupled to the electrical system of the camera 10. In particular, the assembly 16 can be made to activate and deactivate the electronic circuitry of the camera 10 as the assembly 16 is opened and closed. This feature can negate the need for a separate on-off switch mounted on the exterior of the camera 10, thereby allowing a potential reduction in the external dimensions of the camera 10.

In addition to the above-noted advantages, the barrier assembly 16 also provides the benefits of an effective light hood. Furthermore, the assembly 16 forms a protective structure around the lens 13 while the assembly 16 is placed in both its open and closed positions. This feature is particularly advantageous in compact cameras, such as the camera 10, where the picture-taking lens 13 is located in close proximity to the front surface 12a.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of the parts, within the principles of the invention to the full extent indicated by the broad general meaning of the terms in which the appended claims are expressed. For example, one skilled in the art will recognize that variations of the barrier assembly 16 within the scope of the invention may forgo the use of a translating door that also functions as an integral structural member, i.e., variants of the assembly 16 can be constructed without the door 18. As another example, numerous variations in the shape of the vertical member 20 are possible within the contemplated scope of the invention.

What is claimed is:

1. A camera comprising:
a body having a front portion;
a picture-taking lens; and
a barrier assembly coupled to said front portion, said assembly comprising a door and an integrated lens cover/light hood, said cover/hood having an aperture, said assembly being movable between an open position in which said lens is exposed to ambient light through said aperture, and a closed position in which [a] at least a portion of said cover/hood covers said lens and at least a portion of said door is disposed within said aperture.

2. The camera of claim 1, wherein:
said door is rotacoupled to said cover/hood about a first axis;
said door is rotatably coupled to said front portion about a second axis;
movement of said assembly between said open and closed positions causes said door to rotate about said first and second axes; and
movement of said assembly between said open and closed positions causes said first axis to revolve with respect to said second axis.

3. The camera of claim 1, wherein movement of said barrier assembly between said open and closed positions causes said cover/hood to translate laterally and axially in relation to said front portion.

4. The camera of claim 1, wherein said cover/hood comprises a guide pin and said front portion defines a slot, said guide pin slidably engaging said slot, said engagement causing at least a portion of said cover/hood to translate along a substantially arcuate path in relation to said front portion when said cover/hood is moved between said open and closed positions.

5. The camera of claim 1, wherein said cover/hood limits said exposure of said lens, said exposure being substantially limited to ambient light within a field of view of said lens when said assembly is in said open position.

6. The camera of claim 1, wherein said cover/hood and said door define at least a portion of a tunnel around an optical axis of said lens when said barrier assembly is in said open position.

7. The camera of claim 1, wherein said barrier assembly is manually movable.

8. A camera comprising:
a body having a front portion;
a picture-taking lens; and
a barrier assembly coupled to said front portion, said assembly comprising an integrated lens cover/light hood having an aperture, said assembly being movable in a substantially arcuate path between an open position in which at least a portion of said cover/hood extends outward from said front portion and said lens is exposed to ambient light through said aperture, and a closed position in which at least a portion of said cover/hood covers said lens, said cover/hood being adapted to move axially and laterally in relation to said front portion.

9. The camera of claim 8, wherein said cover/hood limits said exposure of said lens, said exposure being substantially limited to ambient light within a field of view of said lens when said assembly is in said open position.

10. The camera of claim 8, wherein said barrier assembly is manually movable.

11. A camera comprising:
a body having a front portion;
a picture-taking lens; and
a barrier assembly coupled to said front portion, said assembly comprising an integrated lens cover/light hood having an aperture, said assembly being movable between a closed position in which at least a portion of said cover/hood covers said lens, and an open position in which said lens is exposed to ambient light through said aperture, said cover/hood limiting said exposure of said lens, said exposure being substantially limited to ambient light within a field of view of said lens when said assembly is in said open position, said cover/hood being spaced from said lens in said open position relative to said closed position.

12. The camera of claim 11, wherein said barrier assembly is manually movable.

13. A 35-mm camera comprising:
a body having a front portion;
a picture-taking lens; and
a barrier assembly coupled to said front portion, said assembly comprising an integrated lens cover/light hood having an aperture, said assembly being movable in a substantially arcuate path between an open position in which at least a portion of said cover/hood extends outward from said front portion and said lens is exposed to ambient light through said aperture, and a closed position in which at least a portion of said cover/hood covers said lens, said cover/hood being adapted to move axially and laterally in relation to said front portion.

14. The camera of claim 13, wherein said cover/hood limits said exposure of said lens, said exposure being substantially limited to ambient light within a field of view of said lens when said assembly is in said open position.

15. The camera of claim 13, wherein said assembly further comprises a door, at least a portion of said door being disposed within said aperture when said assembly is in said closed position.

16. A 35-mm camera comprising:
a body having a front portion;
a picture-taking lens; and
a barrier assembly coupled to said front portion, said assembly comprising an integrated lens cover/light hood having an aperture, said assembly being movable between a closed position in which at least a portion of said cover/hood covers said lens, and an open position in which said lens is exposed to ambient light through said aperture, said cover/hood limiting said exposure of said lens, said exposure being substantially limited to ambient light within a field of view of said lens said cover/hood being spaced from said lens in said open position relative to said closed position.

17. The camera of claim 16, wherein said assembly further comprises a door, at least a portion of said door being disposed within said aperture when said assembly is in said closed position.

18. A method of using a camera comprising:

moving an assembly coupled to a front portion of said camera to an open position by manually sliding said assembly laterally in a first direction relative to a surface of said front portion, said sliding causing said assembly to translate axially away from said front portion and causing a door on said assembly to open to expose a lens and form a light hood; and moving said assembly to a closed position by manually sliding said assembly laterally in a second direction opposite said first direction, said sliding causing said assembly to translate axially closer to said front portion and causing said door to close to cover said lens and form a lens cover.

19. A camera comprising:

a body having a front portion;

a picture-taking lens; and a barrier assembly coupled to said front portion, said assembly comprising a door and an integrated lens cover/light hood, said cover/hood having an aperture, said assembly being movable between an open position in which said lens is exposed to ambient light through said aperture, and a closed position in which at least a portion of said cover/hood covers said lens and at least a portion of said door is disposed within said aperture, wherein said door is rotatably coupled to said cover/hood about a first axis, said door is rotatably coupled to said front portion about a second axis, movement of said assembly between said open and closed positions causes said door to rotate about said first and second axes, and movement of said assembly between said open and closed positions causes said first axis to revolve with respect to said second axis.

20. A camera comprising:

a body having a front portion;

a picture-taking lens; and a barrier assembly coupled to said front portion, said assembly comprising a door and an integrated lens cover/light hood, said cover/hood having an aperture, said assembly being movable between an open position in which said lens is exposed to ambient light through said aperture, and a closed position in which at least a portion of said cover/hood covers said lens and at least a portion of said door is disposed within said aperture, wherein said cover/hood comprises a guide pin and said front portion defines a slot, said guide pin slidably engaging said slot, said engagement causing at least a portion of said cover/hood to translate along a substantially arcuate path in relation to said front portion when said cover/hood is moved between said open and closed positions.

* * * * *

UNITED STATES PATENT AND TRADEMARK OFFICE
CERTIFICATE OF CORRECTION

PATENT NO. : 6,176,626 B1
DATED : January 23, 2001
INVENTOR(S) : Wilfried Bittner Page 1 of 1

It is certified that error appears in the above-identified patent and that said Letters Patent is hereby corrected as shown below:

Column 9,
Line 33, Claim 1, please delete "{a}" after the word "which";
Line 38, claim 2, please delete "rotacoupled" and insert therefor -- rotatably coupled --.

Column 11,
Line 7, claim 16, please insert an -- "," --after the word lens.

Signed and Sealed this

Thirty-first Day of July, 2001

Attest:

Attesting Officer

NICHOLAS P. GODICI
*Acting Director of the United States Patent and Trademark Office*